United States Patent [19]

Rundzaitis et al.

[11] Patent Number: 4,933,080
[45] Date of Patent: Jun. 12, 1990

[54] HOUSING WITH REPLACEABLE FILTER CARTRIDGE FOR USE WITH SHOWER HEAD

[75] Inventors: Alfons Rundzaitis, Beverly Shores, Ind.; Jefferson L. Gentry, Deerfield; John R. Jiambalvo, Chicago, both of Ill.

[73] Assignee: Associated Mills Inc., Chicago, Ill.

[21] Appl. No.: 297,094

[22] Filed: Jan. 13, 1989

[51] Int. Cl.$^5$ .......................... E03C 1/08; B01D 27/08
[52] U.S. Cl. ........................ 210/232; 4/605; 4/615; 210/420; 210/424
[58] Field of Search ............... 4/597, 596, 605, 615, 4/662; 210/100, 232, 282, 420, 424, 426, 427, 428, 429, DIG. 17, 266, 449, 234, 136, 463; 211/65

[56] References Cited

U.S. PATENT DOCUMENTS

| | | | |
|---|---|---|---|
| 2,979,208 | 4/1961 | Humbert | 210/424 |
| 3,262,570 | 7/1966 | Gailitis et al. | 210/266 |
| 3,266,628 | 8/1966 | Price | 210/94 |
| 3,286,847 | 12/1966 | Rothemund | 211/65 |
| 3,469,696 | 9/1969 | Petrucci et al. | 210/282 |
| 3,741,394 | 6/1973 | Defenbaugh | 210/282 |
| 3,760,951 | 9/1973 | Mansfield | 210/449 |
| 3,780,869 | 12/1973 | Kronogos | 210/317 |
| 3,789,991 | 2/1974 | Kronogos | 210/317 |
| 3,822,018 | 7/1974 | Kronogos | 210/323.2 |
| 3,841,346 | 10/1974 | Amblank | 4/615 |
| 3,847,819 | 11/1974 | Firth | 210/131 |
| 3,935,106 | 1/1976 | Lipner | 210/232 |
| 3,950,251 | 4/1976 | Hiller | 210/266 |
| 4,051,036 | 9/1977 | Conrad et al. | 210/DIG. 17 |
| 4,529,515 | 7/1985 | Selz | 210/420 |
| 4,626,350 | 12/1986 | Reid | 210/282 |
| 4,698,164 | 10/1987 | Ellis | 210/100 |
| 4,711,717 | 12/1987 | Wolf | 210/232 |
| 4,828,709 | 5/1989 | Houser et al. | 210/266 |

FOREIGN PATENT DOCUMENTS

| | | | |
|---|---|---|---|
| 2387676 | 12/1978 | France | 210/420 |
| 0187176 | 10/1984 | Japan | 210/429 |
| 0661306 | 7/1987 | Switzerland | 4/615 |

*Primary Examiner*—Frank Spear
*Assistant Examiner*—Joseph Drodge
*Attorney, Agent, or Firm*—Laff, Whitesel, Conte & Saret

[57] ABSTRACT

A shower filter is adapted to be installed between a plumbing pipe and a shower head. The filter includes a changeable filter cartridge. A three position valve in the appliance is able to (a) block all flow of water, (b) deliver filtered water, or (c) deliver unfiltered water. An adapter may be used to enable the appliance to receive different types of filter cartridges.

13 Claims, 1 Drawing Sheet

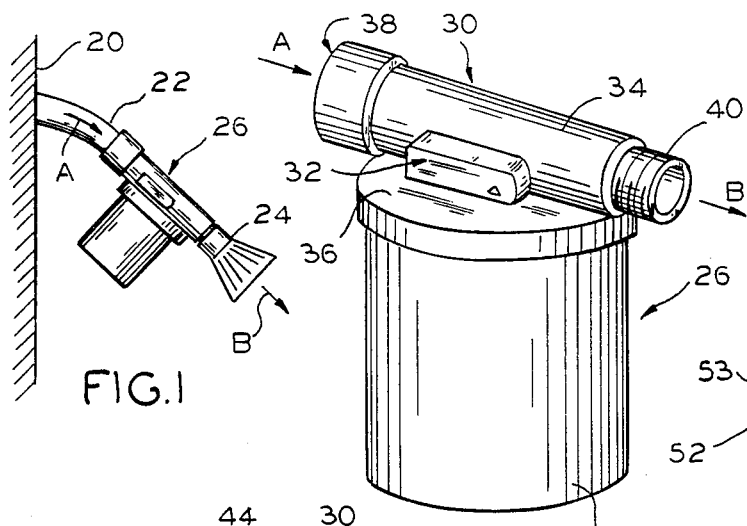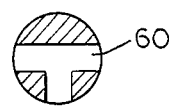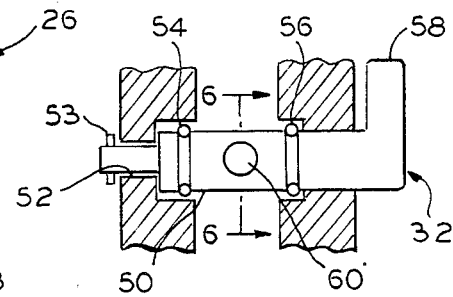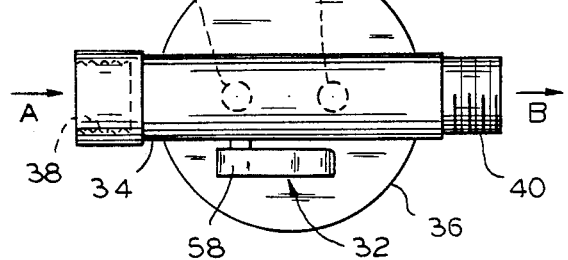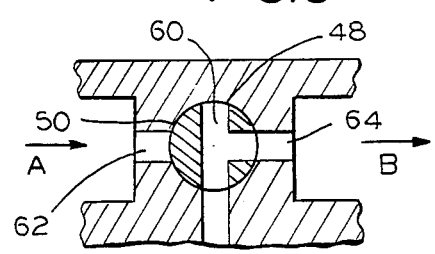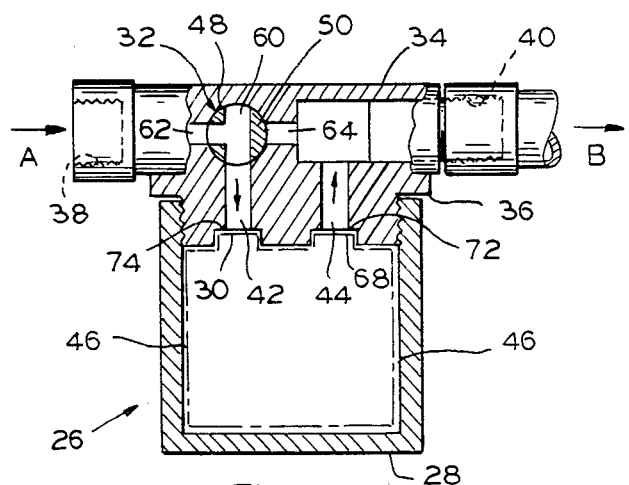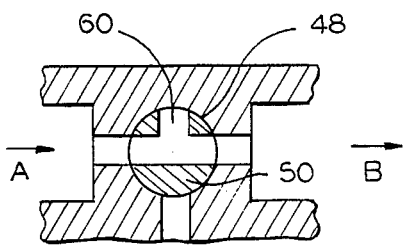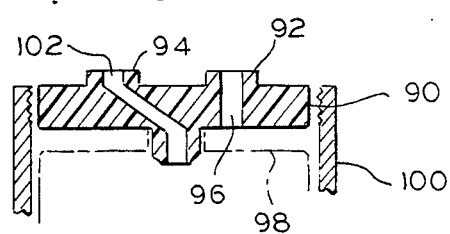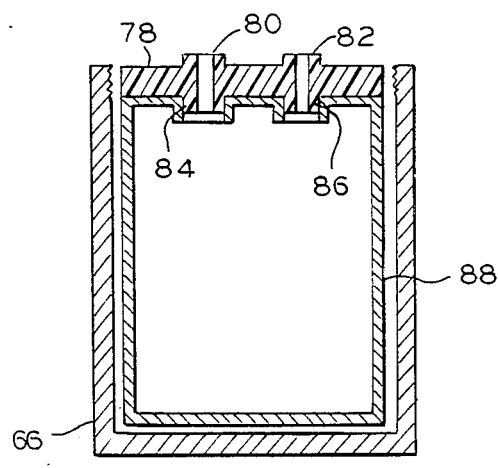

HOUSING WITH REPLACEABLE FILTER CARTRIDGE FOR USE WITH SHOWER HEAD

This invention relates to shower filters and more particularly to filters having replaceable filter cartridges, especially—but not exclusively—for removing chlorine.

In the United States, many public water supplies contain chemicals which, according to *Science News*, Sept. 20, 1986, (Vol. 130, No. 12), sometimes cause cancer and which may lead to the deaths of an estimated 200-1000 persons each year.

Among these chemicals, chlorine is a gas which has a harsh effect upon the skin. The entire skin surface is exposed to both the liquid and the vapor forms of chlorine and other chemicals. Therefore, there is a need for the removal of pollutants, including these and other specific chemicals, from the shower water before they can reach the skin of the person taking the shower.

Another consideration is the advantages realized by using a filter cartridge which is compatible with existing equipment. In particular, it is desirable for the user to have an option to select the one type of existing filter cartridge which best fits his own individual needs. For example, a number of faucet filter cartridges already exist with two or three more or less standardized cartridge sizes. Some of these cartridges are relatively small since they fit onto kitchen faucets where bulky filters are not aesthetically acceptable to most home owners. Other filters use relatively large carbon block or reverse osmosis filters to filter large volumes of water. Some cartridges remove lead from water. Still other filter cartridges are available.

For the greatest flexibility, it would be desirable to have a shower filter which can utilize almost any of these available filter cartridges, according to user preferences. Presumably, the people who are concerned by aesthetics may select the smallest of the filters since it can hardly be seen behind the shower head, while people who are less concerned by appearances may select the larger capacity filters since they have to be changed less often.

Accordingly, an object of the invention is to provide new and improved water filters for installation at a point of delivery and use. Here, an object is to provide filters which may be either small and unobtrusive or large and long lasting.

Another object of the invention is to provide shower water filtration. Here, an object is to remove chlorine and other chemicals from shower water. In this connection, an object is to enable a user to select a filter cartridge which removes a particular pollutant which is most objectionable to him.

Still another object of the invention is to provide means for reducing pollutants from a shower area.

In keeping with an aspect of the invention, these and other objects are accomplished by providing an appliance which may be inserted between a shower plumbing outlet and a shower head. The appliance has a housing or cup with a coupler which may be attached to a mating coupler on the appliance. By substituting different housings or cups, any of a plurality of different filters may be accommodated. The appliance includes a valve that may be operated to bypass or to engage the filter, thereby enabling the user to select whether he does or does not want filtered shower water. For example, a cold shower is less likely than a hot shower to vaporize harmful pollutants. Thus, one might want to bypass the filter if he is using cold water. Conversely, very high temperatures may reduce the effectiveness of the carbon or other filter media and as such one may wish to bypass the filter during high temperature showers, thereby extending the effective life of the filter media.

A preferred embodiment for accomplishing the foregoing objects is shown in the attached drawing wherein:

FIG. 1 shows a plumbing shower outlet, the inventive appliance, and a shower head;

FIG. 2 is a perspective view of the complete inventive appliance;

FIG. 3 is a top plan view of the inventive appliance;

FIG. 4 is a side elevation view of the appliance, partially in cross-section, with a valve rotor in a water filtering position;

FIG. 5 is a plan view of a rotor for a valve used in the inventive appliance;

FIG. 6 is a cross section of the rotor, taken along line 6—6 of FIG. 5;

FIG. 7 is a cross section of the valve which shows the rotor in a water off position;

FIG. 8 is a similar cross section of the valve which shows the rotor in an unfiltered water position;

FIG. 9 shows an adapter and an alternative cup for holding a different filter; and FIG. 10 is a cross section of another adapter which enables the appliance to hold a different filter cartridge.

In FIG. 1, a wall 20 or other suitable support has a plumbing outlet pipe 22 extending therefrom. Normally, a shower head 24 is attached directly to the plumbing outlet pipe 22. To install the inventive filter appliance 26, the shower head is removed and the filter is attached to the plumbing outlet pipe. Then, the shower head is attached to the inventive appliance.

The major parts of the appliance are seen in FIG. 2, as being essentially three molded plastic parts 28, 30, 32. Part 28 is a cup shaped housing which is dimensioned to receive a suitable filter cartridge. Different sizes of cartridges may be accommodated by substituting different sizes of cups 28. Part 30 is an integrally molded combination forming a passageway or pipe 34 and a coupler 36 for attaching a cup or housing. The passageway or pipe 34 has threads 38 on one end for accepting an end of the plumbing pipe 22 and threads 40 on the other end for accepting the shower head 24. Any other suitable connector may also be used. Part 32 is a valve comprising a lever arm attached to a rotor for selecting a mode of water flow.

The details of the appliance should become more apparent by a study of FIGS. 3-8. More particularly, FIGS. 3, 4 show part 30 of the appliance 26 as including a pair of holes 42, 44 formed in the plastic in order to deliver water into and remove water from a filter cartridge 46 in housing or cup 28. A suitable valve rotor 32 is positioned in the passageway or pipe 34 (a) to divert the water into the filter cartridge, (b) to cause it to pass directly through the pipe, or (c) to totally stop the flow.

The details of the valve are seen in FIGS. 4-8. In greater detail, the molded part 30 includes a bore 48 into which a rotor 50 (FIG. 5) slips. The distal end of rotor 52 is supported in a hole which is molded into part 30 at the end of bore 48. The rotor is held in place by a "C" clip 53. Two O-rings 54, 56 are fitted onto the opposite ends of rotor 50 in order to seal against leakage while enabling it to turn in the bore 48. The proximal end of the rotor 50 includes a lever arm 58 which turns the rotor to any one of three different positions for selecting the mode of water flow.

The rotor 50 contains a T-shaped passageway 60 (FIG. 6) in the area between the O-rings 54, 56. When the T-shaped passageway 60 is in the position with the stem of the "T" next to the water inlet 62 (FIG. 4), water at A enters passage 42, passes through filter cartridge 46, outlet passage 44, and to the shower head 24 (FIG. 1), as shown by arrow B. When the lever arm 58 turns the rotor 50 (FIG. 7) to place the stem of the T-shaped passage 60 next to the outlet 64 and the solid side of the rotor next to inlet 62, no water can flow out the showerhead. If the lever arm 58 turns rotor 50 (FIG. 8) so that the cross arm of the T-shaped passage 60 connects the inlet 62 and outlet 64 and with the solid side of the rotor next to opening 42, water flows without filtration from the plumbing pipe 22 to shower head 24.

Integrally formed with the passageway or pipe 34 is a cover plate 36 having a suitable connector (here threads 37) onto which a cup shaped housing 28 may be secured. The housing may contain a filter cartridge 46. Preferably, the cartridge 46 may be any of many widely available on the commercial market. The cartridge 46 which is here shown is: disclosed in U.S. patent application Ser. No. 07/096,906, filed Sept. 15, 1987 now U.S. Pat. No. 4,814,078. Other suitable cartridges are shown in U.S. Pat. Nos. 4,172,796; 4,686,073; 3,853,761; and in U.S. patent application entitled "Large Volume Faucet Filter For Home Use" Ser. No. 07/291,048, filed Dec. 28, 1988. For larger (or smaller) filters, the housing or cup 28 may be replaced by a larger (or smaller) cup 66 (FIG. 9).

As shown in FIG. 4, one of the commercial filter cartridges 46 has protrusions 68, 70 in the end, which fits into recesses 72, 74 formed in the appliance 26. Other commercial filter cartridges have recesses which fit over protrusions in the appliances. Still another commercial filter cartridge has a side entrance and center exit in the end of the filter cartridge. The water percolates from the circumferential periphery through the filter to the center of the cartridge.

In order to use any of these or other similar filter cartridges, an adapter plate 78 (FIG. 9) may be supplied with a cup 66 designed to hold the filter cartridge. The plate 78 has protrusions on both sides. The protrusions 80, 82 fit into the recesses 72, 74 (FIG. 4) in the appliance 26. The protrusions 84, 86 fit into recesses 87, 89 in the end of the filter cartridge 88. Thus, the adapter plate 78 may be used to enable the user to select a filter cartridge of his own choosing.

FIG. 10 shows another adapter plate 90 which may be used in place of plate 78 in FIG. 9. Plate 90 has protrusions 92, 94 which fit into recesses 72, 74 (FIG. 4) of the appliance 26. This time the inlet passageway 62 is connected through opening 96 to a circumferential space between an outside peripheral wall of a filter cartridge 98 and the housing or cup 100. The outlet passageway 44 is connected through opening 102 to a central passageway 104 through the filter cartridge 98. This particular cartridge is shown in the above identified U.S. patent application Ser. No. 07/291,048.

The inventive filter was tested according to the National Sanitation Foundation ("NSF") Standard 42, with due regard for the stagnation which occurs when the filter is not used over a period of time. During testing, the flow rate was 2 gpm at a water temperature of 100° F. and at a static inlet pressure of 50 psig. An average 63% of all chlorine was removed in tests carried out during 100% of the rated life of an exemplary type of filter cartridge (i.e. 500-gallons of filtered water). At 120% of rated life (620-gallons of filtered water), an average of 55% of the chlorine was removed. It is estimated that most showers use about 5-gallons of water. Therefore, the rated life (500 gallons) represents 100 showers.

Those who are skilled in the art will readily perceive how to modify the invention. Therefore, the appended claims are to be construed to cover all equivalent structures which fall within the true scope and spirit of the invention.

The claimed invention is:

1. A shower filter appliance comprising a passageway inserted between a plumbing pipe and a shower head, a housing removably attached to said passageway and containing a replaceable filter cartridge, and a three position valve means associated with said appliance and located to control water flowing from said plumbing pipe through said appliance to said shower head, a first of said positions blocking said water flow through said appliance, a second of said positions diverting said water flow through said filter housing and then out to said shower head, and a third of said positions directing said water flow from said plumbing pipe directly to said shower head without passage through said filter housing.

2. The appliance of claim 1 wherein said valve means comprises a support for a rotor, an elongated rotor supported at its opposite ends in said support, an O-ring on each end of said rotor for sealing said rotor against said support, a T-shaped passageway within said rotor, said support having an inlet and an outlet with said T-shaped passageway arranged to stably confront said inlet and outlet in each of said three positions depending upon the position of said rotor.

3. The appliance of claim 2 wherein said housing has access to openings leading to said T-shaped passageway, said openings terminating in said housing in recesses for receiving protrusions on said replaceable filter cartridge.

4. The appliance of claim 3 having adapter means for converting said recesses into protrusions for receiving recesses on said replaceable filter cartridge.

5. The appliance of claim 4 wherein said adapter comprises a plate having openings for directing said water flow into and removing it from a path extending between a center and an outside perimeter on a top surface of said filter cartridge.

6. A shower filter appliance comprising a passageway inserted between a plumbing pipe and a shower head, a housing removably attached to said passageway and containing a replaceable filter cartridge, and a three position valve means associated with said appliance and located to control water flowing from said plumbing pipe through said appliance to said shower head, said valve means comprising a support for a rotor, an elongated rotor supported at its opposite ends in said support, an O-ring on each end of said rotor for sealing said rotor against said support, a T-shaped passageway within said rotor, said support having an inlet and an outlet with said T-shaped passageway arranged to stably confront said inlet and outlet in each of said three positions depending upon the position of said rotor, a first of said positions blocking said water flow through said appliance, a second of said positions diverting said water flow through said filter housing and then out to said shower head, and a third of said positions directing said water flow from said plumbing pipe directly to said shower head without passage through said filter housing, said housing having access to openings leading to said T-shaped passageway, said openings terminating in said housing in recesses for receiving protrusions on said replaceable filter cartridge, and adapter means for converting said recesses into protrusions for receiving recesses on said replaceable filter cartridge, said adapter comprising protrusions on opposite sides of a plate for converting said recesses into protrusions.

7. An appliance for use with a shower head, said appliance comprising a unitary molded plastic part having first and second threaded openings at two locations defining ends of a passageway arranged to direct a stream of water from a plumbing fitting through said appliance to a shower head, and having a third opening including a connector means for receiving and securing a housing containing a filter cartridge to said appliance, a bore extending into said plastic part and transversely through said passageway, a rotary valve means having a T-shaped opening therein and located in said bore for rotatingly moving between three positions, in one of said positions said rotary valve blocking said passageway, in another of said positions of said rotary valve said T-shaped opening directing said passageway from said fitting through said housing for said filter cartridge and then out to said shower head, and in a third of said positions of said rotary valve said T-shaped opening extending said passageway from said fitting directly through said appliance to said shower head, thereby by-passing said filter cartridge.

8. The appliance of claim 7 having mechanical interfacing adapter means for enabling said housing to interchangeably accept different geometrical types of filter cartridges.

9. The appliance of claim 8 wherein a first type of said filter cartridges has protrusions on its end surface for fitting into recesses in said appliances.

10. The appliance of claim 8 wherein one type of said filter cartridge has recesses in its end surface for fitting onto protrusions associated with said appliance.

11. The appliance of claim 8 wherein said filter cartridge has an outside surface for receiving unfiltered water and a central opening for discharging filtered water.

12. A water filter appliance comprising two unitary plastic parts inserted between a plumbing pipe and a shower head, one of said parts being a cup shaped housing containing a replaceable filter cartridge, the other of said parts having a pipe which is threaded on its opposite ends, a bore extending transversely through said pipe, a rotor mounted in said bore and having a T-shaped passageway through it, said rotor having an O-ring at each of two locations on opposite sides of said T-shaped passageways for enabling said rotor to turn within said bore, a coupler on said parts for removably securing said one part to said other part, a first of a pair of openings extending from said T-shaped passageway through said coupler to said cup when said rotor is in one position, a second of said pair of openings extending from said cup through said coupler to said pipe when said rotor is in another position, and said rotor blocking said board when said rotor is in a third position.

13. The water appliance of claim 12 and lever means for turning said rotor in order to (a) block water flow through said pipe, (b) divert water in said pipe into said cup, or (c) direct water straight through said pipe.

* * * * *